United States Patent
Jolliff (12)
(10) Patent No.: US 6,454,673 B1
(45) Date of Patent: Sep. 24, 2002

(54) SELF ADJUSTING WET BRAKE FOR USE WITH A TRANSMISSION OR TRANSAXLE

(75) Inventor: Norman E. Jolliff, Salem, IN (US)

(73) Assignee: Tecumseh Products Company, Tecumseh, MI (US)

( * ) Notice: Subject to any disclaimer, the term of this patent is extended or adjusted under 35 U.S.C. 154(b) by 1 day.

(21) Appl. No.: 09/689,084

(22) Filed: Oct. 12, 2000

(51) Int. Cl.[7] .......................... F16D 59/092; F16D 65/52
(52) U.S. Cl. ...................... 475/83; 188/72.7; 188/73.1; 192/111 A; 192/93 A
(58) Field of Search .................... 475/83; 74/730.1; 192/111 R, 111 A, 93 A; 188/71.7, 71.8, 72.7, 73.1, 196 BA (56) References Cited

U.S. PATENT DOCUMENTS

| | | | | |
|---|---|---|---|---|
| 2,255,383 A | * | 9/1941 | Hall | 188/71.7 |
| 3,425,519 A | * | 2/1969 | Frigger | 188/106 F |
| 4,633,979 A | | 1/1987 | Edwards | 188/72.7 |
| 4,862,767 A | | 9/1989 | Hauser | 74/687 |
| 4,870,820 A | | 10/1989 | Nemoto | 60/487 |
| 4,905,472 A | | 3/1990 | Okada | 60/464 |
| 5,000,056 A | | 3/1991 | Crawford et al. | 74/371 |
| 5,394,699 A | | 3/1995 | Matsufuji | 60/442 |
| 5,617,764 A | * | 4/1997 | Komura et al. | 475/206 |
| 5,689,955 A | | 11/1997 | Hauser et al. | 60/442 |
| 5,701,738 A | * | 12/1997 | Eberle et al. | 192/3.51 |
| 5,718,308 A | | 2/1998 | Chung | 188/79.51 |
| 5,727,659 A | * | 3/1998 | Brown et al. | 188/72.7 |
| 5,768,955 A | | 6/1998 | Hauser | 74/606 R |
| 5,771,758 A | | 6/1998 | Hauser | 74/606 R |
| 5,918,709 A | | 7/1999 | von Kaler | 188/196 B |
| 6,076,428 A | * | 6/2000 | Thoma et al. | 60/487 |
| 6,123,182 A | | 9/2000 | Dowen | 192/111 A |
| 6,189,410 B1 | * | 2/2001 | Inoue | 475/83 |

* cited by examiner

Primary Examiner—Charles A Marmor
Assistant Examiner—Ankur Parekh
(74) Attorney, Agent, or Firm—Baker & Daniels (57) ABSTRACT

A self adjusting wet brake positioned interior of a transaxle or transmission casing. The self adjusting brake assembly utilizes a brake pad having a cooperating ramp surface which is contacted by a brake cam for brake actuation. The cooperating ramp surface allows the brake mechanism of the current invention to automatically account for brake pad wear and the attendant decrease in brake pad thickness. As the brake pad wears and decreases in thickness, the brake cam progressively contacts ramp surface of the brake pad to effect brake actuation. In one exemplary embodiment, the ramp surface is integral with the brake pad.

32 Claims, 7 Drawing Sheets

FIG_3

FIG_6

FIG_7  FIG_7A  FIG_7B

FIG_8  FIG_8A  FIG_8B

FIG_9

FIG_10

FIG_11

FIG_12

FIG_12A

FIG_12B

FIG_13

FIG_13A

FIG_13B

SELF ADJUSTING WET BRAKE FOR USE WITH A TRANSMISSION OR TRANSAXLE

BACKGROUND OF THE INVENTION

1. Field of the Invention

The present invention relates to a transmission or transaxle, and, more particularly, to a brake apparatus for braking a transmission or transaxle which automatically compensates for brake pad wear

2. Description of the Related Art

Transmissions and transaxles typically include a brake assembly operable to apply braking force thereto. Typically, braking force is applied to the speed reduction mechanism of the transmission or transaxle. In one typical brake apparatus, a brake pad is axially displaced a predetermined distance to frictionally engage a component (e.g., a brake disc) rotationally fixed to a shaft of the speed reduction mechanism to effect braking of the transmission or transaxle. Additionally, a friction backing pad may be utilized to engage the side of the brake disk opposite the brake pad when the brake is engaged. Repeated engagement of the brake assembly causes the material of the brake pad to wear away and, consequently, the axial displacement which formerly engaged the brake is no longer sufficient to effect braking activity. It is therefore desirable that the brake assembly be adjusted to account for brake pad wear and the consequent decrease in brake pad thickness. Prior brake mechanisms required manual adjustment to account for brake pad wear. Such manual adjustments are time consuming to perform and lead to operational down time.

Mechanisms of the prior art have sought to provide a self adjusting brake system to eliminate manual adjustment and the associated problems. Prior art self adjusting brake systems typically utilize a nut threaded to a shaft together with a ratchet mechanism. Typically, a disc having ratchet teeth is connected to the nut and operably engaged with a pawl affixed to the brake lever, with the nut determining the axial position of the brake lever. The brake lever includes a cam surface whereby actuation of the brake lever actuates the brake pad to effect braking. As the brake apparatus is utilized, and the brake pad wears, the nut is axially displaced along the shaft supporting the brake pad and thereby axially displaces the brake lever. Self adjusting brakes of this type are mounted exterior to the transmission or transaxle upon which they act, and, therefore, require additional space, and can be damaged by debris.

What is needed in the art is a self adjusting brake system which eliminates manual adjustment to compensate for brake pad wear and which does not require additional apparatus exterior to the transmission or transaxle housing.

SUMMARY OF THE INVENTION

The present invention provides an improved self adjusting brake for use with a transmission or transaxle, wherein it is desired to provide a self adjusting brake mechanism which does not require additional apparatus exterior to the transmission or transaxle housing and which brake apparatus comprises an internal "wet" type brake. The current invention utilizes a brake pad or brake pad assembly having a ramp surface cooperating with the brake pad and an actuator for engaging the ramp surface and thereby actuating the brake pad. The ramp surface of the current invention allows for self adjustment of the brake mechanism. As the brake pad wears and consequently decreases in thickness, the actuator will progressively engage the ramp surface to effect braking activity. In one exemplary embodiment, the actuator includes a ramp surface which mates with the ramp surface cooperating with the brake pad. The self adjusting brake of the current invention is internally positioned in the transmission or transaxle casing and is therefore lubricated by the transmission or transaxle which advantageously mitigates part wear.

The invention, in one form thereof, comprises a transaxle including a hydrostatic transmission module housed in a hydrostatic transmission module casing. The hydrostatic transmission module includes an output shaft. An axle module is housed in an axle module casing and includes a pair of axles, a reduction gear train and a gear train input shaft detachably connectable to the output shaft of the hydrostatic transmission. The axle module casing is separable into a plurality of axle casing components along a split line substantially perpendicular to the axles. A brake assembly for braking the axle module is mounted internally in the axle casing.

The invention, in another form thereof, comprises a transmission including a housing with a speed reduction mechanism operably positioned therein. A brake assembly is supported by the housing and is operable to selectively apply braking force to the speed reduction mechanism. The brake assembly includes a brake pad, a stepped ramp surface, and an actuator for selectively engaging the stepped ramp surface and thereby actuating the brake pad.

The invention, in a further form thereof, comprises a hydrostatic transaxle including a hydrostatic transmission and a housing with a speed reduction mechanism operatively positioned therein and coupled to the hydrostatic transmission. A brake assembly is supported by the housing and is operable to selectively apply braking force to the speed reduction mechanism. In this form of the current invention, the brake assembly comprises a brake pad having a brake pad ramp surface, and an actuator for selectively engaging the brake pad ramp surface and thereby actuating the brake pad.

The invention, in yet another form thereof, comprises a transmission including housing with a speed reduction mechanism operably positioned therein. A brake assembly is supported by the housing and is operable to selectively apply braking force to the speed reduction mechanism. The brake assembly comprises an actuator and a brake pad having mating ramp surfaces so that movement of the actuator in a given direction engages the mating ramp surfaces and transmits movement of the actuator into movement of the brake pad.

The invention, in yet a further form thereof, comprises a transaxle including a variable speed transmission and a housing with a speed reduction mechanism and a differential operably positioned therein. The housing rotatably supports a pair of axles drivingly connected to the differential. A brake assembly is supported by the housing and is operable to selectively apply braking force to the speed reduction mechanism. In this form of the current invention, the brake assembly comprises a brake pad having a brake pad ramp surface and a brake cam for selectively engaging the ramp surface and thereby actuating the brake pad.

In one form of the current invention, a differential lock is provided so that the differential may be locked and equal power transmitted to each of the axles.

An advantage of the present invention is the ability to eliminate manual adjustment of a brake mechanism utilized to apply braking force to a transmission or transaxle.

Another advantage of the present invention is the ability to provide a self adjusting wet brake housed in a transmission or transaxle casing.

A further advantage of the present invention is the ability to provide a self adjusting brake which does not require additional apparatus exterior to a transmission or transaxle housing.

Yet another advantage of the present invention is the provision of a self adjusting brake of relatively simple construction.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 5:
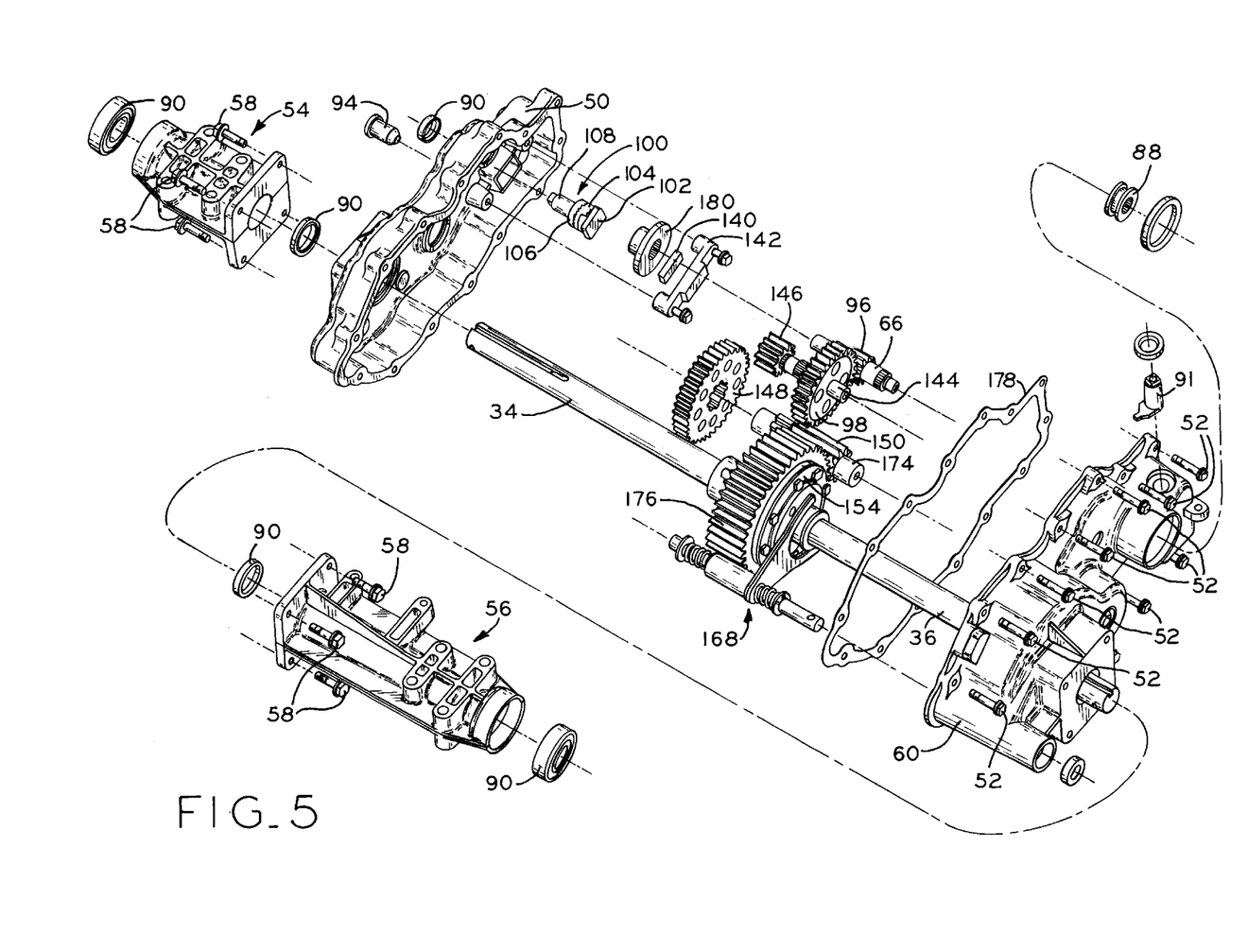
FIG. 5 is an exploded perspective view of a transaxle in accordance with the present invention.
Figures 6, 7, 7A, 7B, 8, 8A, 8B:
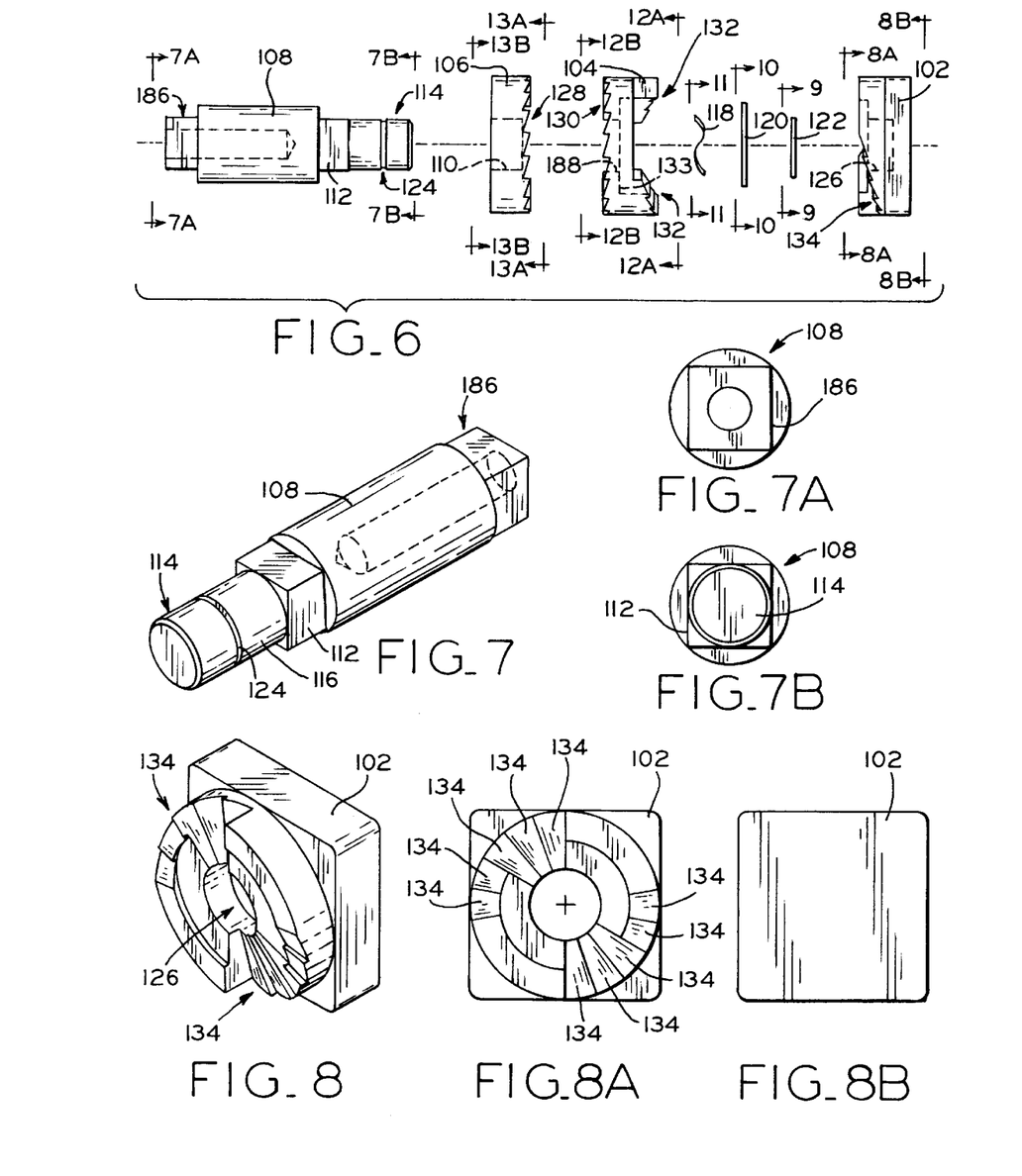
FIG. 6 is an exploded, radial elevational view of a brake assembly in accordance with present invention.
FIG. 7 is a perspective view of a brake rod of the present invention.
FIGS. 7A and 7B are axial elevational views thereof.
FIG. 8 is a perspective view of a brake pad in accordance with the present invention.
FIGS. 8A and 8B are axial elevational views thereof.

Referring now to the drawings and particularly to FIG. 5, there is illustrated axle module 38 having self adjusting brake assembly 100. As illustrated in FIG. 6, self adjusting brake assembly 100 includes brake pad 102, a self adjusting actuator including cam 104 and cam driver 106, and brake rod 108. In on e exemplary embodiment, brake pad 102, self adjusting cam 104, and cam driver 106 are formed from powdered metal, while brake rod 108 is formed from steel.

Figure 13:
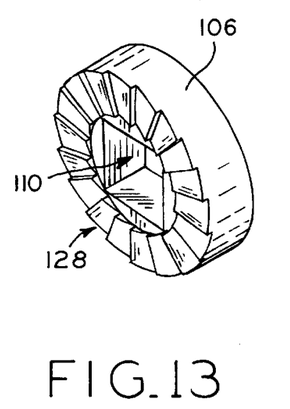
FIG. 13 is a perspective view of a cam driver in accordance with the present invention.
Figure 13A:
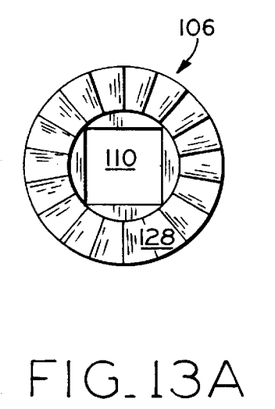
FIGS. 13A and 13B are axial elevational views thereof.
Figure 13B:
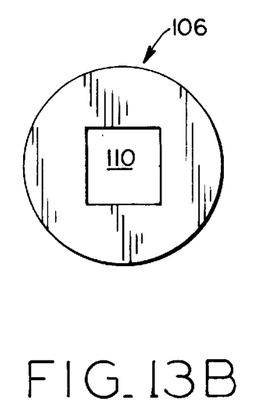

Brake assembly 100 is assembled with brake rod 108 being inserted through aperture 110 of cam driver 106. When cam driver 106 is properly positioned about brake rod 108, aperture 110 of cam driver 106 is positioned about cam driver area 112 of brake rod 108. As illustrated in FIGS. 7 and 7B, cam driver area 112 of brake rod 108 has a square cross section. Similarly, as illustrated in FIGS. 13, 13A, and 13B, aperture 110 of cam driver 106 has a square cross section. Therefore, when cam driver 106 is operably positioned about cam driver area 112 of brake rod 108, cam driver 106 is rotationally fixed to brake rod 108. While aperture 110 of cam driver 106 and cam driver area 112 are illustrated having square cross sections, it will be understood by those skilled in the art that differing geometries, including, e.g., alternative polygonal cross sections may be utilized to rotationally fix cam driver 106 to brake rod 108.

Figure 9:
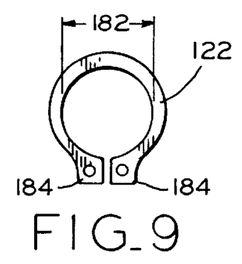
FIG. 9 is an axial elevational view of a retaining ring utilized with a brake assembly in accordance with the present invention.
Figure 10:
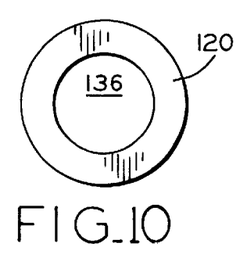
FIG. 10 is an axial elevational view of a washer utilized with a brake assembly in accordance with the present invention.
Figure 11:
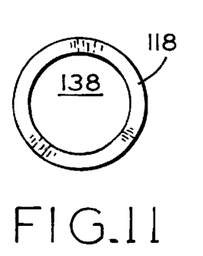
FIG. 11 is an axial elevational view of a wave spring utilized with a brake assembly in accordance with the present invention.
Figures 12, 12A:
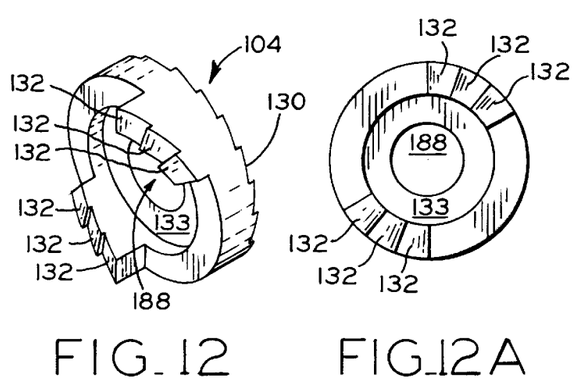
FIG. 12 is a perspective view of a self adjusting cam in accordance with the present invention.
FIGS. 12A and 12B are axial elevational views thereof.
Figure 12B:
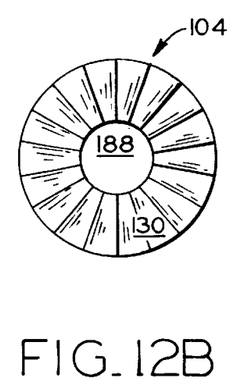

After cam driver 106 is positioned about brake rod 108, self adjusting cam 104 is positioned about brake rod 108. Aperture 188 of self adjusting cam 104 accommodates distal end 114 of brake rod 108 and, in use, is generally positioned about circular self adjusting cam area 116 of brake rod 108. Aperture 188 is circular and is sized so that self adjusting cam 104 is rotationally moveable relative to brake rod 108. After cam driver 106 and self adjusting cam 104 are positioned about brake rod 108, wave spring 118 and washer 120 are positioned over distal end 114 of brake rod 108. As illustrated in FIGS. 10 and 11, washer 120 and wave spring 118 include central apertures 136 and 138, respectively. Central apertures 136 and 138 are sized to accommodate distal end 114 of brake rod 108. Wave spring 118 is placed over distal end 114 of brake rod 108 and positioned directly adjacent recess 133 (FIGS. 12 and 12A) of self adjusting cam 104. Washer 120 is then placed over distal end 114 of brake rod 108 and abuts wave spring 118. Recess 133 of self adjusting cam 104 is radially sized to accommodate washer 120. After positioning wave spring 118 and washer 120, retaining ring 122 (FIG. 9) is positioned over distal end 114 of brake rod 108 and locked in place about groove 124 of brake rod 108. Retaining ring 122 includes inner diameter 182 sized to snugly fit about the outer diameter of groove 124. As will be understood by those skilled in the art, ends 184 of retaining ring 122 will be spread (i.e., moved away from each other) to allow retaining ring 122 to fit about distal end 114 of brake rod 108. After being positioned about groove 124, retaining ring 122 will return to its undeformed position and fit snugly about groove 124. When retaining ring 122 is positioned about groove 124, it abuts washer 120. Thus retaining ring 122 limits the axial movement of cam driver 106 and self adjusting cam 104.

Figure 1:
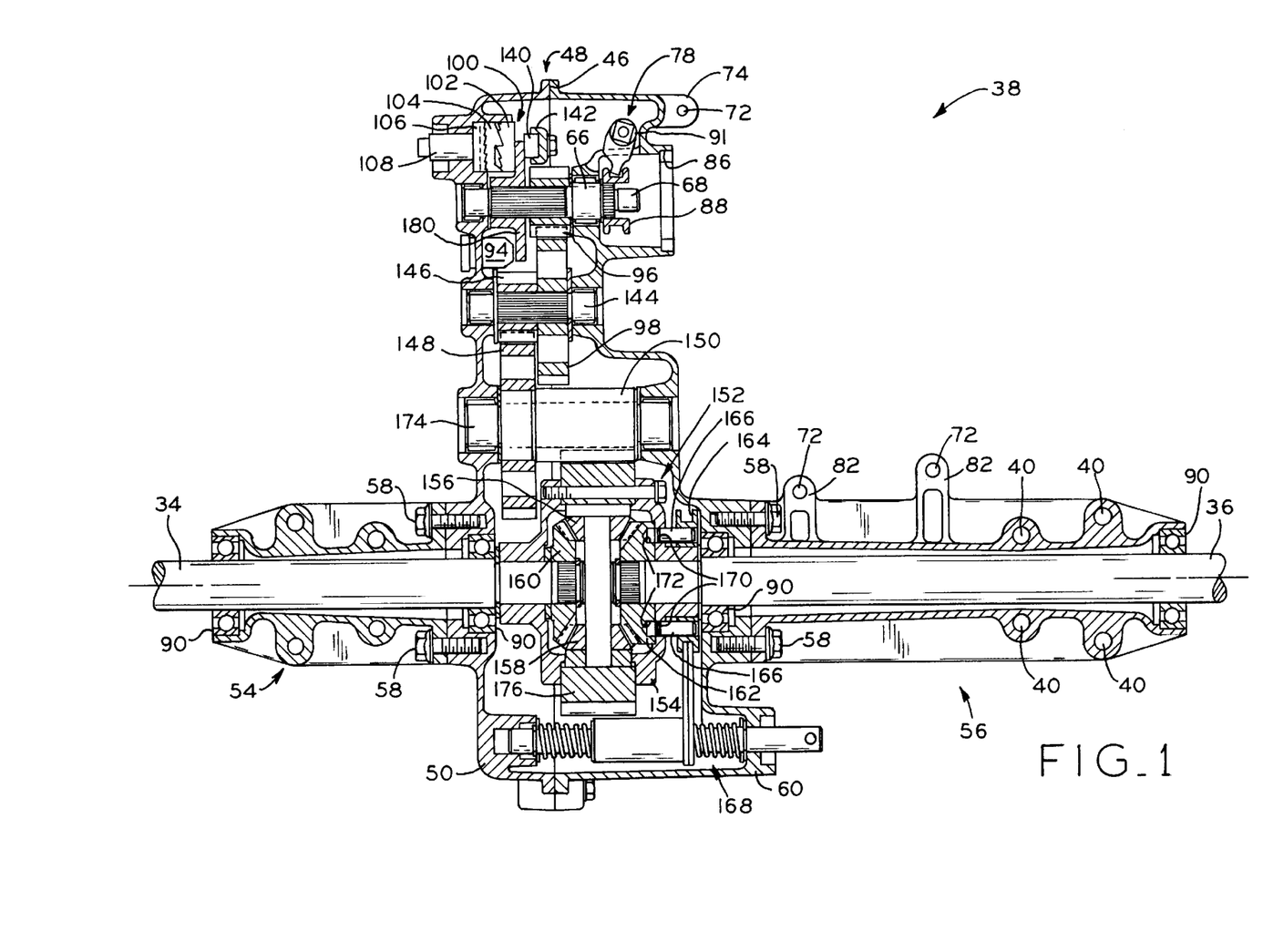
FIG. 1 is a sectional top elevational view of a transaxle in accordance with the present invention.

After placement of retaining ring 122 about groove 124 of brake rod 108, distal end of brake rod 108 is inserted through central aperture 126 of brake pad 102 to complete brake assembly 100. In operation, proximal end 186 (FIGS. 6, 7, and 7A) of brake rod 108 is rotated to actuate brake assembly 100. As described above, cam driver 106 is rotationally fixed to brake rod 108 for rotation therewith. As illustrated, e.g., in FIGS. 6, 13, 13A, 12, and 12B, cam driver 106 and self adjusting cam 104 include cooperative, toothed ratchet and pawl surfaces 128 and 130 respectively. Cooperative ratchet and pawl surfaces 128, 130 operate to transmit rotational movement of cam driver 106 into rotational movement of self adjusting cam 104 in one direction of movement and allow relative rotational movement between cam driver 106 and self adjusting cam 104 in the opposite direction of rotational movement. As is known in the art, ratcheting mechanisms of this type produce axial movement of one of the members as ratcheting takes place. Wave spring 118 is provided to absorb this axial movement. Cooperating surfaces 128, 130 are provided so that brake assembly 100 may be actuated by rotational movement of brake rod 108 in one and so that brake rod 108 can experience limited rotational movement and still actuate brake assembly 100. FIG. 1 illustrates brake assembly 100 actuated to provide frictional engagement with brake disc 180.

Referring again to FIG. 6, self adjusting cam 104 includes stepped ramp or cam surfaces 132. Additionally, brake pad 102 includes stepped ramp surfaces 134 (See also FIGS. 8, and 8A). In operation, cam surfaces 132 of self adjusting cam 104 contact ramp surfaces 134 of brake pad 102 such that rotational movement of self adjusting cam 104 causes axial displacement of brake pad 102. Brake pad 102 will be configured so as to resist rotational movement so that brake pad 102 will not rotate with self adjusting cam 104. In one embodiment, brake pad 102 will have a square cross sectional area (with the exception of the portion of brake pad 102 which comprises ramp surfaces 134, which will have a circular cross section), as illustrated in FIG. 8. As illustrated in FIG. 1, brake pad 102 abuts a portion of primary axle casing 48 (discussed below) so that a side of brake pad 102 will engage primary axle casing 48 and thereby prohibit rotational movement of brake pad 102. In this embodiment, brake assembly 100 is no longer operable after the square cross section portion of brake pad 102 is worn away by repeated frictional engagements with brake disc 180. After the portion of brake pad 102 having a square cross section is worn away, ramp surfaces 134 will simply rotate with self-adjusting cam 104. The present invention also contemplates an embodiment in which ramp surfaces 134 are not integral with brake pad 102. The brake mechanism of such an embodiment will function such that the ramp surfaces will cooperate with the brake pad for actuation thereof.

As illustrated in FIG. 8, ramp surfaces 134 of brake pad 102 comprise progressively stepped ramp surfaces. In one exemplary embodiment, ramp surfaces 134 are stepped in twenty degree intervals. In operation, cam surfaces 132 of self adjusting cam 104 progressively contact stepped ramp surfaces 134 of brake pad 102 as brake pad 102 wears and consequently decreases in thickness. When brake pad 102 is new, self adjusting cam 104 will contact the ramp surface of brake pad 102 of the least height. As the brake pad wears, cam surface 132 of self adjusting cam 104 will progressively contact ramp surfaces of brake pad 102 of increasing height, thus automatically compensating for brake pad wear. In use, as the brake pad deteriorates, the brake mechanism will experience a gradual loss of effectiveness which will signal to the user that a replacement pad is required.

Figure 2:
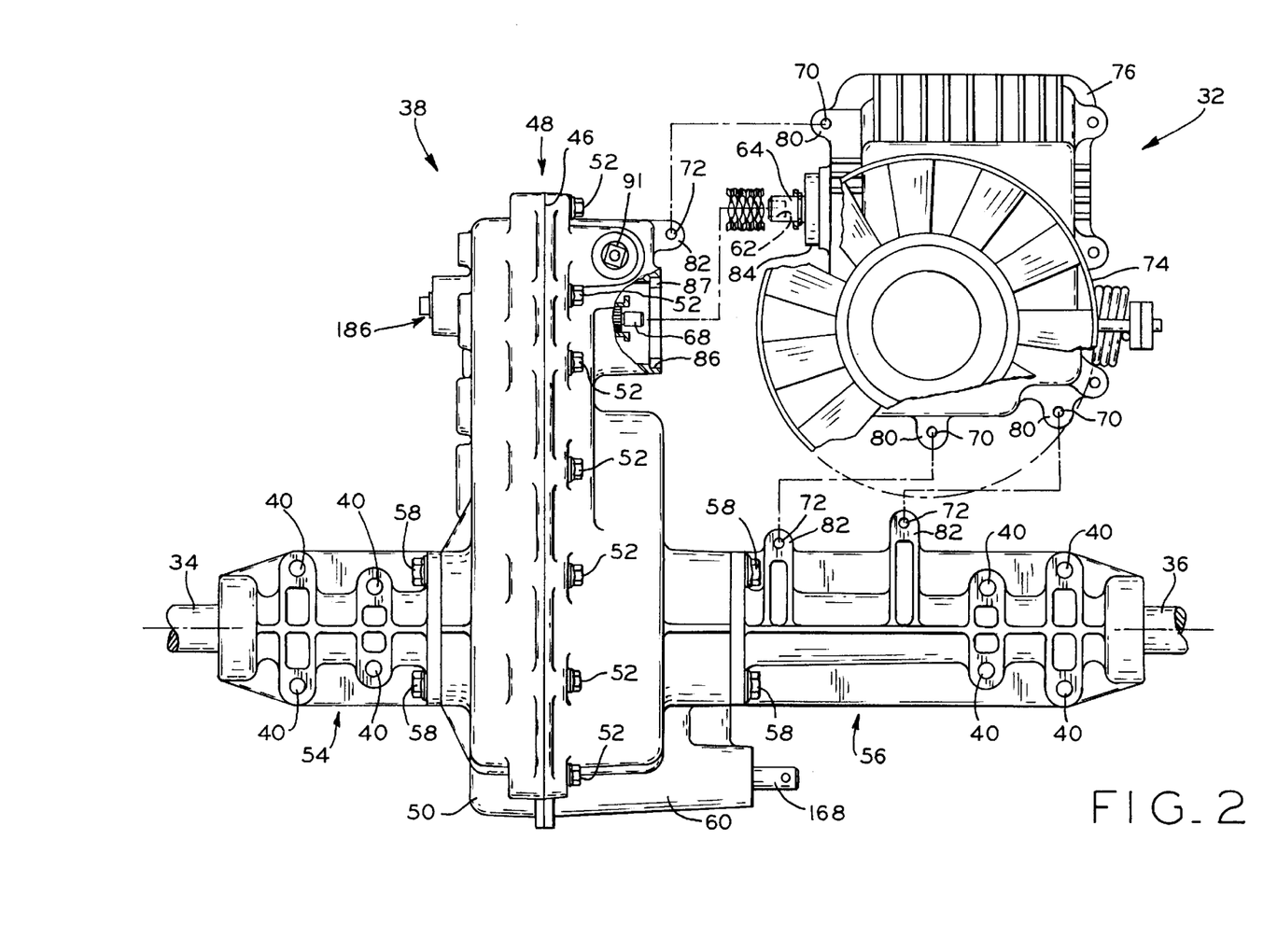
FIG. 2 is a top elevational view of a transaxle in accordance with the present invention, including illustration of a hydrostatic transmission module connectable thereto.
Figure 4:
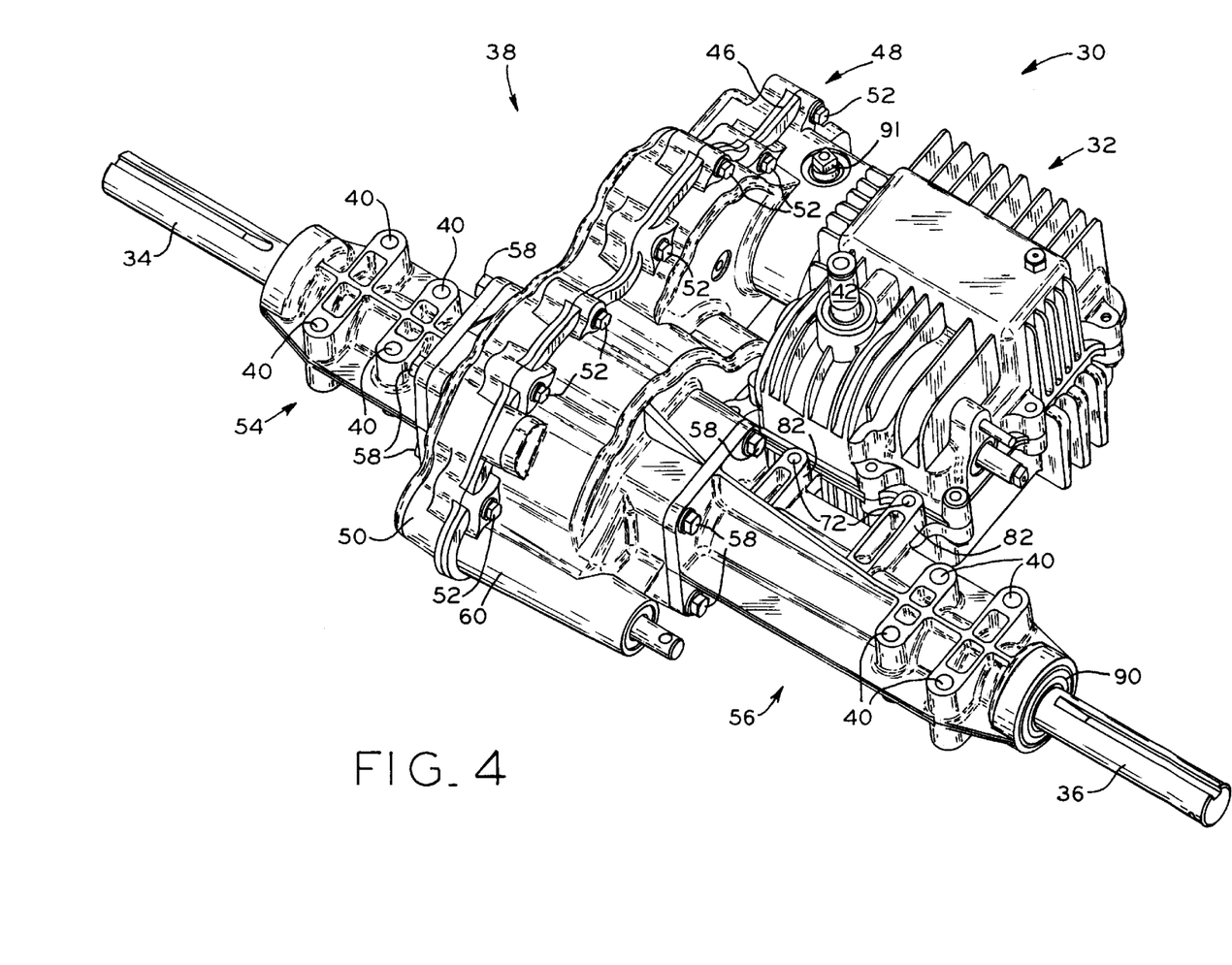
FIG. 4 is a perspective view thereof, including a modular hydrostatic transmission module affixed thereto.

Reference will now be made to a particular embodiment of a hydrostatic transaxle utilizing the self adjusting brake of the current invention. Referring to FIG. 4, there is illustrated hydrostatic transmission 30, which is a transaxle including hydrostatic transmission module 32 fastened to axle module 38. Hydrostatic transmission module 32 is the subject of pending U.S. patent application Ser. No. 09/498,692 entitled "Hydrostatic Transaxle Having Axial Piston Motor and Method for Manufacturing Transaxles," assigned to the assignee of the present invention, the disclosure of which is herein explicitly incorporated by reference. Hydrostatic transmission module 32 receives power from a power source (not shown), such as, e.g., an internal combustion engine. As illustrated in FIG. 2, hydrostatic transmission module 32 includes pulley 74 operably connected thereto. Pulley 74 is engaged with a belt (not shown) which is further engaged with the power source. Pulley 74 is affixed to input shaft 42 of hydrostatic transmission module 32. Power is transmitted from the power source to the hydrostatic transmission module 32, axle module 38 and thereafter to axles 34, 36.

Figure 3:
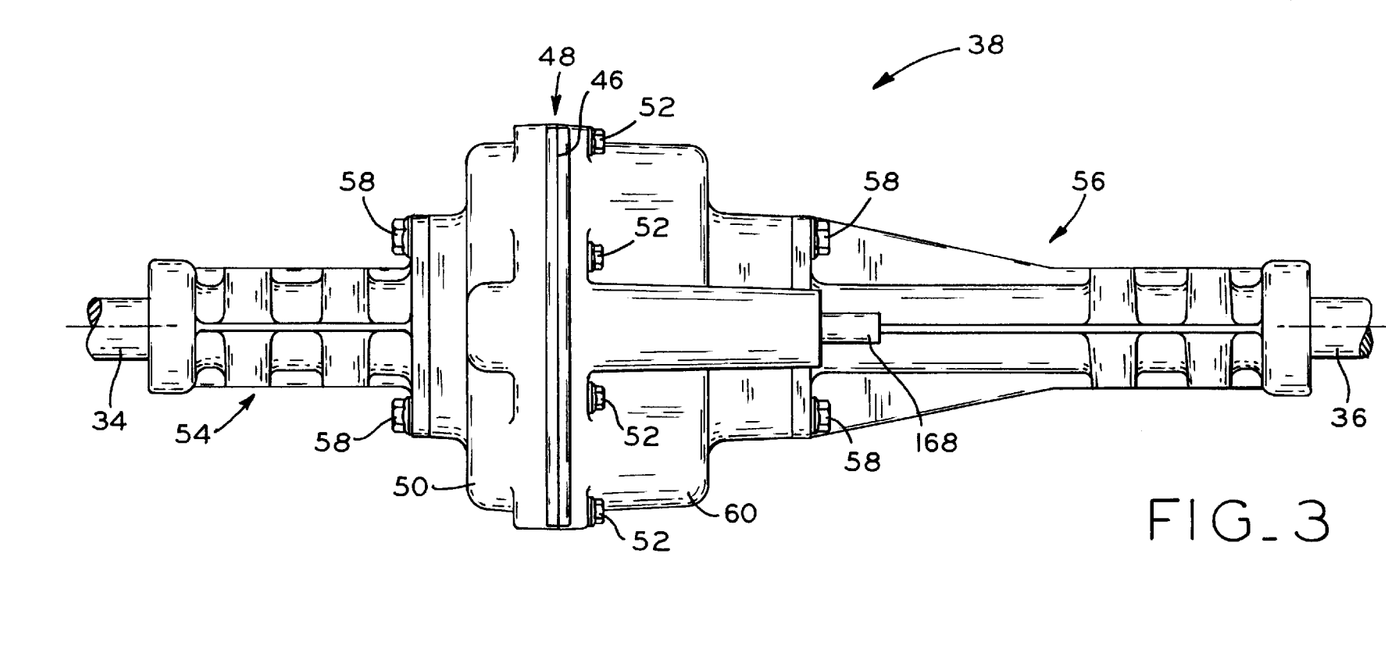
FIG. 3 is a radial elevational view illustrating a transaxle in accordance with the present invention.

As illustrated, e.g., in FIGS. 2 and 4, axle module 38 includes a plurality of apertures 40 through which bolts may pass to affix axle module 38 to a vehicle frame (not shown). Axle module 38 is formed of primary axle casing 48 having split line 46 which is substantially perpendicular to axles 34, 36 and secondary axle casings 54, 56. Bolts 58 join secondary axle casings 54, 56 to primary axle casing 48 with gasket 178 (FIG. 5) positioned therebetween. Similarly, bolts 52 join first half 50 and second half 60 of primary axle casing 48. The orientation of split line 46 (i.e., substantially perpendicular to axles 34, 36) of axle casing 48 advantageously allows the use of full bearings 90 to support axles 34, 36. FIG. 3 illustrates axle module 38 in assembled form.

FIG. 2 illustrates piloting of hydrostatic transmission module 32 to axle module 38. Hydrostatic transmission module 32 includes output shaft 64 having central bore 62. Gear train input shaft 66 (FIG. 1) includes end 68 sized for insertion into bore 62 of output shaft 64. End 68 of gear train input shaft 66 (FIG. 5) is recessed into second half 60 of primary axle casing 48. Output shaft 64 protrudes from hydrostatic transmission casing 76 so that end 68 of gear train input shaft 66 may be piloted to bore 62 of output shaft 64 to guide placement of hydrostatic transmission module 32 in operative engagement with axle module 38. Hydrostatic transmission module 32 includes protrusions 80 having apertures 70. Similarly, axle module 38 includes protrusions 82 having apertures 72. Apertures 70 axially align with apertures 72 after output shaft 64 is piloted to end 68 of gear train input shaft 66. After piloting of hydrostatic transmission module 32 to axle module 38, bolts (not shown) are placed through apertures 70, 72 and are utilized to affix hydrostatic transmission module 32 to axle module 38. Output shaft 64 is supported by sleeve and bearing assembly 84. Sleeve and bearing assembly 84 extends into recess 86 of axle module 38 with oil seal 87 therebetween. However, the piloting of hydrostatic transmission module 32 to axle module 38 is accomplished solely via end 68 of gear train input shaft 66 and bore 62 of output shaft 64.

Hydrostatic transmission module 32 is described in pending U.S. patent application Ser. No. 09/498,692, incorporated by reference supra. Axle module 38 of the current application is larger than the axle module disclosed in U.S. patent application Ser. No. 09/498,692 and is designed for heavier duty operation. Thus, as described in pending U.S. patent application Ser. No. 09/498,692, hydrostatic transmission module 32 is adaptable for a use in varying applications. As further disclosed in U.S. patent application Ser. No. 09/498,692, hydrostatic transmission modules 32 may be utilized with either a left or right drive transaxle. With this in mind, it is clear that while depicted as a right hand hydrostatic transaxle, the current invention may similarly be configured as a left hand hydrostatic transaxle.

Upon piloting of hydrostatic transmission module 32 to axle module 38, disconnect mechanism 78 is utilized to rotationally fix output shaft 64 to gear train input shaft 66. Disconnect mechanism 78 is disclosed in U.S. Pat. No. 5,701,738 assigned to the assignee of the present application and herein expressly incorporated by reference. As illustrated, e.g., in FIG. 1, disconnect mechanism 78 includes splined sleeve 88 and lever 91. Lever 91 is rotationally supported by second half 60 of primary axle casing 48 and is operable to axially displace splined sleeve 88. For the sake of brevity, disconnect mechanism 78 will not be discussed in further detail, and the reader is directed to U.S. Pat. No. 5,701,738 for further explanation thereof.

Referring now to FIGS. 1 and 5, brake pad 102 (FIGS. 8, 8A, and 8B) is selectively actuatable by brake assembly 100 for frictional engagement with brake disc 180. Friction backing pad 140 is held in place by friction backing pad holder 142 and is laterally disposed from brake pad 102, with brake disc 180 positioned between friction backing pad 140 and brake pad 102. Brake disc 180 is splined to gear train input shaft 66 such that actuation of brake assembly 100 brings brake disc 180 into frictional contact with friction backing pad 140 and brake pad 102. Oil plug 94 is affixed to first half 50 of primary axle casing 48 and can be utilized to check the oil level in the axle casing. FIG. 1 illustrates an embodiment of the brake assembly of the current invention wherein friction backing pad 140 is vertically oriented, while FIG. 5 illustrates an embodiment in which friction backing pad 140 is horizontally oriented. These configurations are depicted for illustrative purposes only and are not meant to be limiting in any way. It will be understood by those skilled in the art that various friction backing pad/brake pad placements may be utilized within the teachings of the current invention.

As described above, gear train input shaft 66 is selectively connectable to output shaft 64 of hydrostatic transmission module 32. Power transmitted from hydrostatic transmission module 32 to gear train input shaft 66 is thereafter communicated through a speed reduction mechanism to differential 152. FIGS. 1 and 5 illustrate embodiments of such a speed reduction mechanism. Input shaft pinion gear 96 is splined to gear train input shaft 66 and is in toothed engagement with intermediate gear 98. Intermediate gear 98 is splined to intermediate shaft 144 which additionally carries intermediate pinion gear 146 splined thereto. Intermediate pinion gear 146 is in toothed engagement with gear 148. Gear 148 is splined to differential drive shaft 174. Differential drive shaft 174 includes differential pinion gear 150 cut therefrom. Differential pinion gear 150 is in toothed engagement with differential ring gear 176. Differential gear 152 operates to transmit rotational motion to axles 34, 36 as is known in the art. Differential 152 includes differential housing 154 with bevel gears 156, 158, 160, and 162 rotationally supported therein. In the embodiment illustrated in FIGS. 1 and 5, a differential lock is provided so that upon engagement of the differential lock, axles 34 and 36 receive equal rotational movement.

To effect differential locking, differential housing 154 includes apertures 170 sized to accommodate locking pins 166. Similarly, side bevel gear 162 of differential 152 includes bores 172 sized to accommodate locking pins 166. Locking pins 166 are affixed to shift collar 164 which is operably connected to differential lock actuator 168. Bores 172 and apertures 170 are coaxially alignable so that actuation of shift collar 164 by differential lock actuator 168 places locking pins 166 through bores 172 and apertures 170, thus rotationally engaging side bevel gear 162 with differential housing 154 and locking differential 152.

While this invention has been described as having a preferred design, the present invention can be further modified within the spirit and scope of this disclosure. This application is therefore intended to cover any variation, uses, or adaptations of the invention using its general principles. Further, this application is intended to cover such departures from the present disclosure as come within known or customary practice in the art to which this invention pertains and which fall within the limits of the appended claims.

What is claimed is:

1. A transaxle comprising:
   a hydrostatic transmission module housed in a hydrostatic transmission module casing, whereby said hydrostatic transmission module includes an output shaft;
   an axle module housed in an axle module casing, said axle module including a pair of axles, a reduction gear train and a gear train input shaft detachably connectable to said output shaft, wherein said axle module casing is separable into a plurality of axle casing components along a split line substantially perpendicular to said pair of axles; and
   a brake assembly for braking said axle module, said brake assembly mounted internally in said axle casing, said brake assembly located within a space between said axle casing components.

2. The transaxle of claim 1, further comprising:
   an externally operated disconnect mechanism operable to selectively connect said output shaft to said gear train input shaft in driving relationship.

3. The transaxle of claim 1, wherein said brake assembly comprises:
   a brake pad;
   a plurality of stepped ramp surfaces; and
   an actuator for selectively engaging said stepped ramp surfaces and thereby actuating said brake pad.

4. The transaxle of claim 3, wherein said stepped ramp surfaces are integral with said brake pad.

5. The transaxle of claim 3, wherein said actuator includes an actuator ramp surface for selectively engaging said stepped ramp surfaces and thereby actuating said brake pad.

6. The transaxle of claim 5, wherein said actuator ramp surface comprises a plurality of stepped ramp surfaces.

7. A transmission, comprising:
   a housing;
   a speed reduction mechanism operatively positioned in said housing;
   a brake assembly operatively supported by said housing, said brake assembly operative to selectively apply braking force to said speed reduction mechanism, said brake assembly comprising:
      a brake pad;
      a plurality of stepped ramp surfaces; and
      an actuator for selectively engaging said stepped ramp surfaces and thereby actuating said brake pad.

8. The transmission of claim 7, wherein said stepped ramp surfaces are integral with said brake pad.

9. The transmission of claim 7, wherein said actuator includes an actuator ramp surface for selectively engaging said stepped ramp surfaces.

10. The transmission of claim 9, wherein said actuator ramp surface comprises a plurality of stepped ramp surfaces.

11. A hydrostatic transaxle, comprising:
   a hydrostatic transmission;
   a housing;
   a speed reduction mechanism operatively positioned internally in said housing and coupled to said hydrostatic transmission;
   a brake assembly operatively supported by said housing, said brake assembly operative to selectively apply braking force to said speed reduction mechanism, said brake assembly comprising:
      a brake pad having a brake pad ramp surface; and
      an actuator for selectively engaging said brake pad ramp surface and thereby actuating said brake pad.

12. The transaxle recited in claim 11, wherein said actuator includes an actuator ramp surface for selectively engaging said brake pad ramp surface.

13. The transaxle recited in claim 12, wherein said brake pad ramp surface and said actuator ramp surface are axially oriented and selectively engageable in a facing manner.

14. The transaxle recited in claim 11, wherein said actuator comprises a brake cam for selectively engaging said brake pad ramp surfaces.

15. The transaxle recited in claim 14, wherein said brake pad ramp surface comprises a plurality of stepped ramp surfaces, and wherein said brake cam progressively engages said stepped ramp surfaces as said brake pad wears.

16. The transaxle recited in claim 11, wherein said speed reduction mechanism comprises a gear reduction having a plurality of shafts rotatably mounted in said housing and supporting a plurality of intermeshing gears, and wherein said brake assembly is operative to selectively apply braking force to on of said shafts.

17. The transaxle of claim 11, wherein said actuator comprises:
a self adjusting cam including a self adjusting cam ramp surface; and
a cam driver operable to actuate said self adjusting cam, wherein actuation of said self adjusting cam brings said self adjusting cam ramp surface and said brake pad ramp surface into operable contact, thereby actuating the brake pad;
wherein one of said self adjusting cam and said cam driver includes a plurality of ratchet teeth and the other of said self adjusting cam and said cam driver includes a pawl engageable with said ratchet teeth, whereby actuating said cam driver to engage said pawl and one of said ratchet teeth thereby actuates said self adjusting cam.

18. The transaxle of claim 17, wherein said ratchet teeth and said pawl are axially oriented and selectively engageable in a facing manner.

19. The transaxle of claim 17, wherein said brake assembly is located interior of said housing, and further comprising:
a brake rod connected to said cam driver and operable to actuate said cam driver, a proximal end of said brake rod being exterior to said housing, said brake rod rotatably supported by said housing.

20. The transaxle as recited in claim 11, wherein said actuator comprises a brake cam for selectively engaging said brake pad ramp surface, and further comprising:
a friction backing pad affixed to said housing; and
a brake disk affixed to said speed reduction assembly, said friction backing pad and said brake pad positioned on opposing sides of said brake disk, whereby both said friction backing pad and said brake pad frictionally engage said brake disk when said brake assembly operates to apply braking force to said speed reduction mechanism;
wherein said brake pad ramp surface comprises a plurality of stepped ramp surfaces, and wherein said brake cam progressively engages said stepped ramp surfaces as said brake pad wears and consequently decreases in thickness.

21. A transmission, comprising:
a housing;
a speed reduction mechanism operably positioned in said housing;
a brake assembly operably supported by said housing, said brake assembly operable to selectively apply braking force to said speed reduction mechanism, said brake assembly comprising:
an actuator; and
a brake pad;
wherein said actuator and said brake pad include mating ramp surfaces, and whereby movement of said actuator in a given direction brings said mating ramp surfaces into operative engagement and transmits movement of said actuator into movement of said brake pad.

22. The transmission recited in claim 21, wherein said speed reduction mechanism comprises a gear reduction having a plurality of shafts rotatably mounted in said housing and supporting a plurality of intermeshing gears, and wherein said brake assembly is operative to selectively apply braking force to one of said shafts.

23. The transmission of claim 22, wherein said brake assembly further comprises a brake disk rotationally fixed to said one of said shafts, and wherein said brake pad is selectively frictionally engageable with said brake disk.

24. The transmission of claim 21, wherein said actuator comprises:
a self adjusting cam including one of said mating ramp surfaces; and
a cam driver operable to actuate said self adjusting cam;
wherein one of said self adjusting cam and said cam driver includes a plurality of ratchet teeth and the other of said self adjusting cam and said cam driver includes a pawl selectively engageable with said ratchet teeth, whereby actuating said cam driver in said given direction engages said pawl and one of said ratchet teeth and thereby actuates said self adjusting cam in said given direction.

25. The transmission of claim 24, wherein said ratchet teeth and said pawl are axially oriented and selectively engageable in a facing manner.

26. The transmission of claim 21, wherein said brake assembly is located interior of said housing.

27. The transmission of claim 25, wherein said brake assembly is located interior of said housing, and wherein said transmission further comprises:
a brake rod connected to said cam driver and operable to actuate said cam driver, a proximal end of said brake rod being exterior to said housing, said brake rod rotatably supported by said housing.

28. The transmission of claim 21, wherein said mating ramp surfaces each comprises a stepped ramp surface.

29. The transmission of claim 28, wherein said actuator is rotated to axially displace said brake pad, and wherein said transmission further comprises:
a friction backing pad affixed to said housing; and
a brake disc affixed to said speed reduction assembly, said friction backing pad and said brake pad positioned on opposing sides of said brake disc, whereby both said friction backing pad and said brake pad frictionally engage said brake disc when said brake assembly operates to apply braking force to said speed reduction mechanism;
wherein said stepped ramp surfaces are progressively engaged to transmit movement of said actuator into movement of said brake pad as said brake pad wears and consequently decreases in thickness.

30. A transaxle, comprising:
a variable speed transmission;
a housing;
a speed reduction mechanism operably positioned in said housing and coupled to said transmission;

a differential drivingly connected to said speed reduction mechanism;

a pair of axles drivingly connected to said differential; and a brake assembly operably supported by said housing, said brake assembly operable to selectively apply braking force to said speed reduction mechanism, said brake assembly comprising:

a brake pad having a brake pad ramp surface; and a brake cam for selectively engaging said ramp surface and thereby actuating said brake pad.

31. The transaxle of claim 30, further comprising:

a differential lock for selectively locking said differential, whereby said pair of axles receive equal power from said speed reduction mechanism when said differential lock is engaged to lock said differential.

32. The transaxle of claim 31, wherein said differential lock comprises:

a pin affixed to a shift collar mounted for axial movement on a differential casing of said differential, said differential casing including an aperture sized to accommodate said pin, wherein a side gear of said differential includes a bore sized to accommodate said pin and wherein said bore is coaxially alignable with said aperture; and displacement means for axially displacing said shift collar, whereby said pin occupies said aperture and said bore when said differential lock is engaged.

\* \* \* \* \*

UNITED STATES PATENT AND TRADEMARK OFFICE
CERTIFICATE OF CORRECTION

PATENT NO. : 6,454,673 B1
DATED : October 12, 2000
INVENTOR(S) : Norman E. Jolliff

It is certified that error appears in the above-identified patent and that said Letters Patent is hereby corrected as shown below:

<u>Title page,</u>
Item [57], ABSTRACT,
Line 9, after contacts insert -- the --

<u>Column 9,</u>
Line 19, delete "on" and substitute therefor -- one --

Signed and Sealed this

Fourth Day of February, 2003

JAMES E. ROGAN
*Director of the United States Patent and Trademark Office*